United States Patent [19]

Eustache et al.

[11] Patent Number: 5,661,870

[45] Date of Patent: Sep. 2, 1997

[54] MOTOR VEHICLES WINDSCREEN WIPER COMPRISING A SPRAY LINE ON THE WIPER BLADE

[75] Inventors: Jean-Pierre Eustache, Antony; Jean-Louis Roumegoux, Paris, both of France

[73] Assignee: Valeo Systemes d'Essuyage, La Verriere, France

[21] Appl. No.: 716,383

[22] PCT Filed: Jan. 17, 1996

[86] PCT No.: PCT/FR96/00074

§ 371 Date: Sep. 19, 1996

§ 102(e) Date: Sep. 19, 1996

[87] PCT Pub. No.: WO96/22206

PCT Pub. Date: Jul. 25, 1996

[30] Foreign Application Priority Data

Jan. 19, 1995 [FR] France .................................. 95 00804

[51] Int. Cl.⁶ .............................. B60S 1/48; B60S 1/52; B60S 1/38
[52] U.S. Cl. ......................... 15/250.04; 15/250.46; 15/250.44; 15/250.201; 15/250.32
[58] Field of Search ................... 15/250.04, 250.01, 15/250.02, 250.201, 250.46, 250.44, 250.361, 250.43, 250.48, 250.41, 250.31, 250.32

[56] References Cited

U.S. PATENT DOCUMENTS

| 2,910,715 | 11/1959 | Ohrt ........................... | 15/250.04 |
| 3,296,647 | 1/1967 | Gumbleton .................. | 15/250.04 |
| 3,854,161 | 12/1974 | Benson ....................... | 15/250.04 |

FOREIGN PATENT DOCUMENTS

| 2648771 | 12/1990 | France . |
| 2676694 | 11/1992 | France . |
| 2211458 | 7/1989 | United Kingdom . |

Primary Examiner—Gary K. Graham
Attorney, Agent, or Firm—Morgan & Finnegan, LLP

[57] ABSTRACT

A motor vehicle windscreen wiper comprising blade holder arm, a wiper blade and a spray line for spraying the window or windscreen to be wiped. Said spray line extends substantially along one side surface of the wiper blade and the wiper blade comprises a hinged pressure distribution construction comprising at least one intermediate yoke hinged to a main yoke about a hinge pin, and a noise-reducing member with two parallel side walls inserted between the side arms of the main yoke and the side flanges of the intermediate yoke. Said spray line extends along one of the side arms of the main yoke and is integrally moulded into the material of the noise-reducing member.

11 Claims, 1 Drawing Sheet

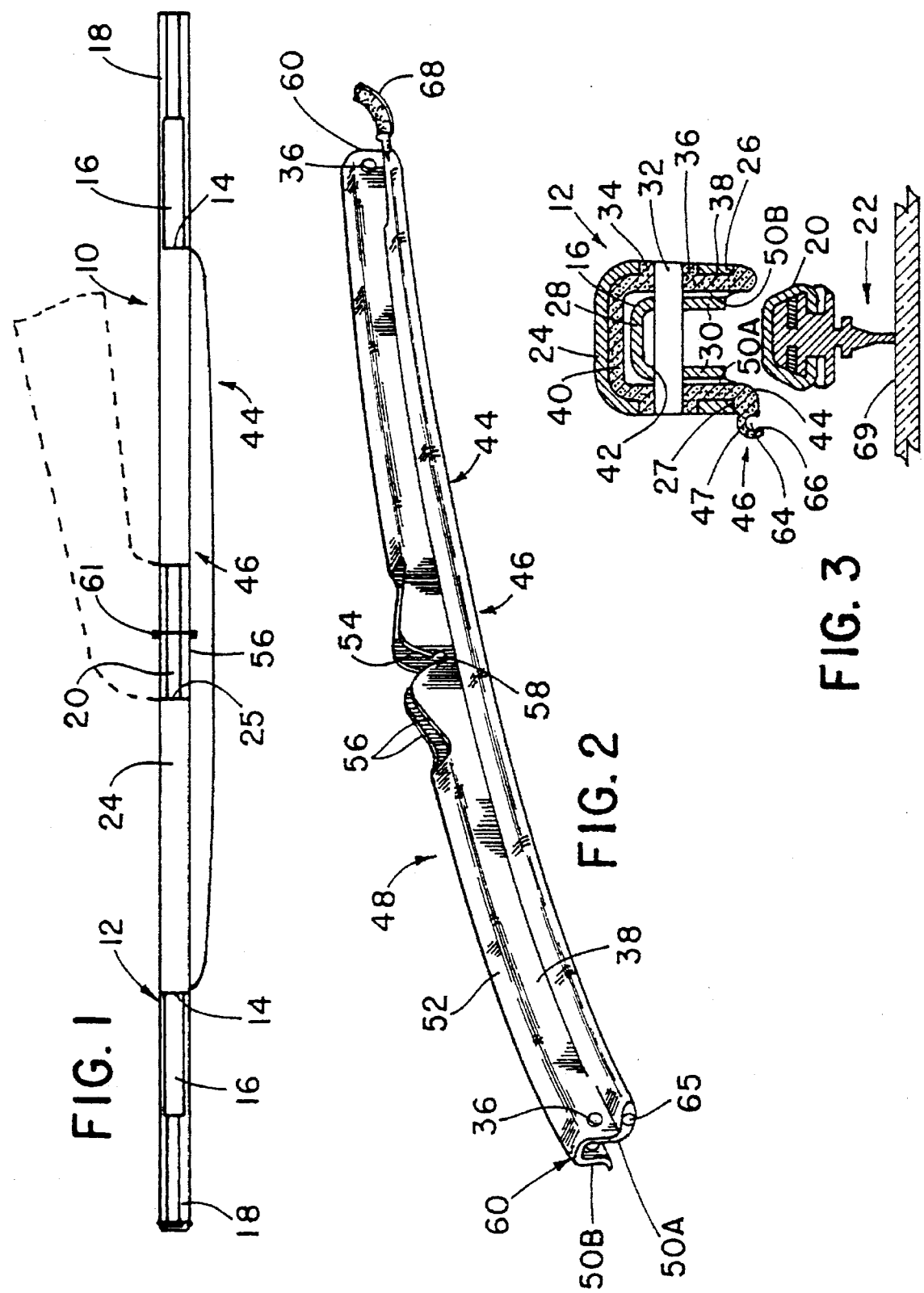

MOTOR VEHICLES WINDSCREEN WIPER COMPRISING A SPRAY LINE ON THE WIPER BLADE

BACKGROUND OF THE INVENTION

More particularly, the invention relates to a screen wiper of the type comprising a blade-carrying arm together with a screen wiper blade, which comprises, for distribution of the pressure on the wiping strip, an articulated structure which includes at least one yoke articulated about a pivot axis at right angles to the general direction of the blade, the wiper being also of the type which includes a ramp for wetting the swept glass surface, this ramp extending at least partly along a lateral face of the screen wiper blade.

SUMMARY OF THE INVENTION

The arrangement of such a wetting ramp along the screen wiper blade enables effective wetting to be obtained by good distribution of the points from which a washing product is sprayed onto the swept glass surface.

In this connection, the wetting ramp must be arranged as close as possible to the wiping zone, that is to say close to the wiping strip which is carried by the articulated pressure-distributing structure that carries the wiping strip.

In accordance with various known designs, it has previously been proposed to form the wetting ramp in the form of an independent component which generally takes the form of a rigid elongate body that is juxtaposed against a lateral face of the main yoke of the articulated structure, to which it is fixed by means of hooking clips, by elastic clipping or by fasteners such as screws, rivets, collars etc.

All of these designs have the disadvantage that they ar detrimental to the aerodynamic profile of the screen wiper blade, and are also detrimental to its general appearance.

It has also previously been proposed to integrate the wetting ramp into the screen wiper blade, or into one of the components of the blade where the latter are made by moulding in a plastics material, Such a solution cannot however be achieved in all cases, and in particular where the articulated support structure is made by assembly and articulation of essentially metallic components.

An object of the present invention is to propose a new design for a screen wiper of the type mentioned above, and in particular for the means for fastening the wetting ramp which simplify mounting and fastening of the ramp, and which also enables a profiled wetting ramp body to be of an agreeable appearance, independently of the fastening means.

To this end, the invention proposes a screen wiper for a motor vehicle, of the type comprising a blade-carrying arm, a screen wiper blade, and a ramp for wetting the swept glass surface and extending substantially along a lateral face of the screen wiper blade, and of the type in which the screen wiper blade includes an articulated pressure-distributing structure which comprises at least one intermediate yoke articulated on a main yoke about a pivot pin, which is substantially at right angles to the longitudinal direction of the main yoke and which extends through two side wing portions of the main yoke and two parallel side portions of the intermediate yoke, together with a noise deadening element having two parallel side walls, which are interposed between the side wing portions of the main yoke and the side portions of the intermediate yoke, and through which the body of the pivot pin passes, characterised in that the wetting ramp extends along one of the side wing portions of the main yoke, and in that the ramp is formed integrally by moulding with the noise deadening element.

In accordance with further features of the invention:

the wetting ramp comprises a longitudinal wetting body portion, through which there extends longitudnally a channel for distribution of the washing liquid, and which has a set of orifices for spraying the swept glass surface, and in that the longitudinal wetting body portion is joined to the longitudinal lower edge of one of the side walls of the noise deadening element;

each of the two opposed longitudinal ends of the main yoke receives an intermediate yoke by articulation, with a noise deadening element being interposed, and the body portion of the wetting ramp is formed integrally by moulding with both of the noise deadening elements;

the wetting body portion is formed with an integral, vertical stiffening wall, in which two side walls of the two noise deadening elements are integrated;

the wetting ramp includes a longitudinal mounting body portion formed integrally by moulding with the longitudinal wetting body portion, and which has a profile in the form of an inverted U in transverse cross section, which is complementary to the profile of the main yoke within which the said body portion is lodged, the two noise deadening elements being integrated in the wetting body portion;

the mounting body portion comprises two parallel stiffening walls together with an upper connecting spine portion;

the main yoke has an upper spine portion which joins together the side wing portions, and which has an opening for the passage through it of a connector for articulation of the end of the screen wiper arm on a pivot pin which extends transversely between the side wing portions, facing the opening, the .connecting spine portion of the mounting body of the wetting ramp has an opening which is complementary to the opening in the spine portion of the yoke, and the upper edges of the lateral stiffening walls, in the region of the opening, have aligned notches in which the pivot pin is fitted elastically, so as to complete fastening of the wetting ramp on the main yoke in the central articulating zone of the latter;

the wetting ramp extends along the lower edge of the associated side wing portion of the main yoke, and it has a form which substantially matches that of the said side wing portion;

the outer face of the wetting body portion is profiled so as to constitute an aerodynamic deflector;

the wetting body portion includes, at one of its longitudinal ends, a connection for connecting the distribution channel with a duct for the supply of washing liquid under pressure.

Further features and advantages of the invention will appear on a reading of the following detailed description, for an understanding of which reference is made to the attached drawings, in which:

BRIEF DESCRIPTION OF THE DRAWINGS

FIG. 1 is a top plan view of a screen wiper with an articulated structure for supporting a wiping strip, which is equipped with a wetting ramp made in accordance with the invention;

FIG. 2 is a perspective view of the wetting ramp with which the blade of FIG. 1 is equipped; and FIG. 3 is a view in cross section taken on the line 3—3, in which the assembled components are shown on a larger scale.

DETAILED DESCRIPTION OF THE INVENTION

In accordance with a known design, the screen wiper blade assembly 10 shown in FIG. 1 includes a main yoke 12, with, articulated to the opposed longitudinal ends 14 of the main yoke, two intermediate yokes 16, each of which carries, articulated to it, swingle bars 18 which support the claw 20 of a wiping strip 22.

The main yoke 12 has an inverted U-shaped profile in cross section, and to this end it comprises an upper spine portion 24 and two parallel side wing portions 26.

Similarly, each intermediate yoke 12 has an inverted U-shaped profile in transverse cross section and, to this end, it comprises an upper spine portion 28 which joins together two parallel side portions 30.

The upper spine portion 24 of the main yoke 12 has a rectangular opening 25 in its central part, for articulation thereon of the free end of a screen wiper arm (not shown).

In accordance with a known design, a noise deadening element is interposed between the main yoke 12 and the intermediate yoke 16 in the zone of articulation of these latter.

Each of the articulations consists of a rod constituting a pivot pin 32, which extends through holes 34 formed for this purpose in the side wing portions 26, with bushes 36, formed integrally with the parallel and vertical side walls 38 of a noise deadening element which has a profile in the form of an inverted U in transverse cross section, the parallel side walls 38 being joined together for this purpose by an upper spine portion 40.

Each pivot pin 32 also extends through aligned holes 42 which are formed in the side portions 30 of the corresponding intermediate yoke 16.

In accordance with the invention, a wetting ramp 44 is made by moulding in a plastics material integrally with the noise deadening elements.

For this purpose, and as can be seen in FIG. 2, the wetting ramp 44 has in its lower part a main wetting body portion 46, and in its upper part, a mounting body portion 48. The mounting body portion 48 is an element having an elongate form which is complementary to the internal profile of the main yoke 12.

In this connection, the upper, mounting, body portion 48 includes two parallel lateral stiffening walls 50A, 50B, which are joined together through an upper connecting spine portion 52.

In its central part, the upper connecting spine portion 52 has an opening 54, the contour of which is complementary to that of the opening 26 formed in the spine portion 24 in the top of the main yoke 12.

The free upper edges 56 of the lateral stiffening walls 50A, 50B define the opening 54 and include notches 58, in which the body of the pivot pin 61 for articulation of the screen wiper arm, which extends transversely between the side wing portions 26 of the main yoke 12 at the level of the opening 25, is received.

In the vicinity of its opposed longitudinal ends 60, each of the two stiffening walls 50A, 50B includes the bushes 36, which are formed integrally with it by moulding. The side walls 38 of the noise deadening element consist of portions of the walls 50A, 50B, into which they are integrated, while the spine portions 40 are integrated into the spine portion 52.

The longitudinal lower edge 62 of the lateral stiffening wall 50A is extended by the longitudinal wetting body portion 46, which, in its fitted position, extends along the lower longitudinal edge 27 of the corresponding side wing portion 26 of the main yoke 12.

The longitudinal wetting body portion 46 has a longitudinal channel 64 for distributing washing liquid through orifices 66, so as to provide distributed spraying of the swept glass surface 69.

The longitudinal wetting body 44 may include at one of its free ends a spray jet 65, with a connection 68 at its other free end for connecting it to a supply duct (not shown) for supplying washing liquid under pressure.

According to one feature which is not shown in the drawings, it is possible to make the outer face 47 of the longitudinal wetting body portion 46 with a profile such that the wetting ramp 44 also constitutes an aerodynamic deflector.

Mounting and fastening of the assembly of the components shown in the drawings is carried out in the following way.

The operator begins by putting the mounting body portion 48 of the wetting ramp 44 in position inside the main yoke 12.

To do this, he inserts the bushes 36 by elastic deformation into the holes 34, and he also inserts the pivot pin 61 into the notches 58 formed in the edges 56 of the opening 54.

At this stage of the assembly operation, the wetting ramp 44 is fixed on the main yoke 12.

The remainder of the operation for assembly of the components is carried out in the conventional way, that is to say by fitting in place the intermediate yokes 16 and then the rods which constitute the pivot pins 32.

It then only remains to make the connection 68 to a washing liquid supply duct.

The invention is not limited to the embodiment which has just been described.

It is for example possible to form the wetting ramp simply by making it integral with two noise deadening elements of conventional design, in the absence of a complete mounting body such as is present in the embodiment just described.

We claim:

1. A screen wiper assembly for movement over a swept glass surface of a motor vehicle, said assembly comprising:

an elongated wiper arm;

an elongated screen wiper blade supported by said arm;

an elongated ramp having spray means thereon for wetting the swept glass surface, said ramp extending substantially along a lateral face of the screen wiper blade, said screen wiper blade includes an articulated pressure distribution structure which comprises a pair of intermediate yokes, said intermediate yokes articulated on an elongated main yoke about a pair of pivot pins, said pivot pins extend substantially perpendicular to the longitudinal direction of the main yoke and extend through, respectively, two side wing portions of the main yoke and two parallel side portions of the intermediate yoke; and a pair of noise deadening elements, each having two parallel side walls, are interposed between the side wing portions of the main yoke at opposite ends, respectively, and the parallel side portions of the intermediate yokes, and through which the pivot pins pass, the wetting ramp extends along one of the side wing portions of the main yoke, and the ramp is formed integrally by moulding of one piece with the noise deadening elements.

2. A screen wiper assembly according to claim 1, wherein the spray means comprises a longitudinal wetting body portion having an outer face, in said body portion there extends longitudinally a channel for distribution of the washing liquid, and which has a set of orifices for spraying the swept glass surface, and in that the longitudinal wetting body portion is joined to a longitudinal lower edge of one of the side walls of the noise deadening element.

3. A screen wiper assembly according to claim 2, wherein the wetting body portion is formed with an integral, vertical stiffening wall, in which two side walls of the two noise deadening elements are integrated.

4. A screen wiper assembly according to claim 2, wherein the wetting ramp extends along a lower edge of the associated side wing portion of the main yoke, and in that it has a form which substantially matches that of the said side wing portion.

5. A screen wiper assembly according to claim 4, wherein the outer face of the wetting body portion is profiled so as to constitute an aerodynamic deflector.

6. A screen wiper assembly according to claim 5, wherein the wetting body portion includes, at one of its longitudinal ends, a connection for connecting the distribution channel to a duct for supply of washing liquid under pressure.

7. A screen wiper assembly according to claim 2, wherein the wetting body portion includes, at one of its longitudinal ends, a connection for connecting the distribution channel to a duct for supply of washing liquid under pressure.

8. A screen wiper assembly according to claim 1, wherein the wetting ramp includes a longitudinal mounting body portion formed integrally by moulding with the longitudinal wetting body portion, and which has a profile in the form of an inverted U in transverse cross section, which is complementary to the profile of the main yoke within which the said body portion is lodged, the two noise deadening elements being integrated in the wetting body portion.

9. A screen wiper assembly according to claim 8, wherein the mounting body portion comprises two parallel stiffening walls together with an upper connecting spine portion.

10. A screen wiper assembly according to claim 9 wherein the main yoke has an upper spine portion which joins together the side wing portions, and which has an opening for passage through it of a connector for articulation of an end of the screen wiper arm on a pivot pin which extends transversely between the side wing portions, facing the opening, and in that the connecting spine portion of the mounting body of the wetting ramp has an opening which is complementary to the opening in the spine portion of the main yoke, and in that upper edges of the lateral stiffening walls, in the region of the opening, have aligned notches in which the pivot pin is fitted elastically, so as to complete fastening of the wetting ramp on the main yoke in the central articulating zone of the latter.

11. A screen wiper assembly according to claim 10, wherein wetting ramp extends along the lower edge of the associated side wing portion of the main yoke, and in that it has a form which substantially matches that of the said side wing portion.

* * * * *